(12) United States Patent
Jones

(10) Patent No.: US 8,554,231 B2
(45) Date of Patent: Oct. 8, 2013

(54) ADAPTATION OF PORTABLE BASE STATIONS INTO CELLULAR NETWORKS

(75) Inventor: Kenneth Jones, Atkinson, NH (US)

(73) Assignee: Airvana LLC, Chelmsford, MA (US)

( * ) Notice: Subject to any disclaimer, the term of this patent is extended or adjusted under 35 U.S.C. 154(b) by 807 days.

(21) Appl. No.: 11/968,090

(22) Filed: Dec. 31, 2007

(65) Prior Publication Data

US 2009/0170520 A1    Jul. 2, 2009

(51) Int. Cl.
*H04W 36/00*    (2009.01)

(52) U.S. Cl.
USPC ............... 455/439; 455/432.2; 455/432.3; 455/435.1; 455/440; 455/445

(58) Field of Classification Search
USPC .................. 455/435.1–439, 11–1, 13.1
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,558,356 B2 | 7/2009 | Pollman et al. |
| 7,558,588 B2 | 7/2009 | To et al. |
| 2002/0196749 A1 | 12/2002 | Eyuboglu et al. |
| 2003/0100311 A1 | 5/2003 | Chung et al. |
| 2003/0203716 A1* | 10/2003 | Takahashi et al. ............ 455/11.1 |
| 2004/0228296 A1 | 11/2004 | Lenzini et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0198336 A1* | 9/2006 | Major et al. .................. 370/328 |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |

(Continued)

FOREIGN PATENT DOCUMENTS

| | | |
|---|---|---|
| CN | 1307788 | 8/2001 |
| CN | 1555637 A | 12/2004 |

(Continued)

OTHER PUBLICATIONS

International Search Report and Written Opinion from PCT application No. PCT/US2008/087659, mailed Mar. 20, 2009 (20 pages).

(Continued)

*Primary Examiner* — Dai A Phuong
(74) *Attorney, Agent, or Firm* — Fish & Richardson P.C.

(57) ABSTRACT

A method includes modifying at least one communications protocol packet being passed between at least one of a plurality of portable base stations and a core network, such that the core network considers the plurality of portable base stations as a single base station.

18 Claims, 9 Drawing Sheets

(56) References Cited

U.S. PATENT DOCUMENTS

| | | |
|---|---|---|
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0105527 A1 | 5/2007 | Nylander et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0178880 A1* | 8/2007 | Saito et al. ............ 455/405 |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0243872 A1 | 10/2007 | Gallagher et al. |
| 2007/0248042 A1 | 10/2007 | Harikumar et al. |
| 2007/0293222 A1 | 12/2007 | Vikberg et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0132239 A1* | 6/2008 | Khetawat et al. ............ 455/438 |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0152059 A1* | 6/2008 | Suemitsu et al. ............ 375/356 |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0259835 A1 | 10/2008 | Venkatachalam et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2010/0091763 A1 | 4/2010 | Thompson |
| 2011/0176526 A1 | 7/2011 | Jones |

FOREIGN PATENT DOCUMENTS

| | | |
|---|---|---|
| CN | 101946556 | 1/2011 |
| EP | 1868325 | 12/2007 |
| GB | 2452688 | 3/2009 |
| GB | 2468260 | 9/2010 |
| GB | 2468260 B | 8/2012 |
| IN | 2406/KOLNP/2010 | 11/2011 |
| WO | WO9967967 | 12/1999 |
| WO | WO0074402 | 12/2000 |
| WO | WO 2005/120101 | 12/2005 |
| WO | WO 2009/088708 | 7/2009 |

OTHER PUBLICATIONS

International Preliminary Report on Patentability from PCT application No. PCT/US2008/087659, mailed Jul. 15, 2010 (9 pages).

Amendment filed in corresponding Chinese application No. 200880127209.7 on Apr. 25, 2011 (19 pages).

Response to Office action from United Kingdom application No. 1011043.5 issued on Jan. 17, 2012, response filed Mar. 14, 2012 (9 pages).

Indian Publication Notice from Indian application No. 2406/KOLNP/2010A issued Nov. 25, 2011 (1 page).

Office action from United Kingdom application No. 1011043.5 issued on Mar. 30, 2012 (2 pages).

Office action from United Kingdom application No. 1011043.5 issued on Jan. 17, 2012 (2 pages).

USPTO Non Final Office Action in U.S. Appl. No. 13/073,512, dated Jan. 31, 2013, 7 pages.

Response to Office action from United Kingdom application No. 1011043.5 issued on Mar. 30, 2012, response filed May 21, 2012 (14 pages).

Examination Report with English translation from Chinese application No. 200880127209.7 issued Oct. 10, 2012 (15 pages).

* cited by examiner

ADAPTATION OF PORTABLE BASE STATIONS INTO CELLULAR NETWORKS

FIELD

This description relates to directing packets among base stations and networks.

BACKGROUND

Wireless devices such as cellular telephones, laptops, and Personal Digital Assistants (PDAs) are ubiquitous in today's culture of wireless communications and networking. Cellular wireless communications systems are designed to serve multiple wireless-enabled devices distributed over a large geographic area by dividing the area into regions called "cells". At or near the center of each cell, a network-side access device (e.g., an access point) is located to serve client devices located in the cell and commonly referred to as "access terminals." An access terminal generally establishes a call, also referred to as a "communication session," with an access point to communicate with other entities (e.g., servers) in the network. Often the access terminals are mobile while the access points are stationary points of communication like cellular base stations. As wireless networking has moved into homes, businesses, vehicles, and other environments, local wireless access points have proliferated.

SUMMARY

In general the disclosure features methods for integrating a relatively large numbers of local wireless access points into, for example, a conventional cellular wireless communications systems, such a system being composed of stationary cellular base stations interfaced to a core network, in such a way that the behavior of the existing system need not be modified to accommodate the added population of local wireless access points. The method makes the access points in the aggregate appear as one or possibly just a few stationary cellular base stations.

In general, one aspect of subject matter described in this specification can be embodied in a method that includes modifying one or more communications protocol packets being passed between one or more portable base stations and a core network, such that the core network considers the portable base stations as a single base station. Other implementations of this aspect include corresponding systems, apparatus, and computer program products.

These and other implementations can optionally include one or more of the following features. The method may further include receiving one packet from one portable base station of a plurality of portable base stations. The first packet may include an identifier that uniquely identifies the portable base station, a handset in communication with the portable base station and a communication session established between the handset and the core network. The method may also include replacing the identifier with another identifier to form another packet that identifies the source of the first packet as an aggregate of portable base stations. The method may also include providing the second packet to the core network, wherein the core network considers the plurality of portable base stations to be the aggregate of portable base stations.

The method may further include receiving a packet from the core network for delivery to a handset in communication with a portable base station that is included in the plurality of portable base stations. The packet may include an identifier that identifies an aggregate of portable base stations, the handset and a communication session between the handset and the core network. The method may also include replacing the identifier with another identifier, which identifies a destination portable base station, to form another packet. The method may also include providing the second packet to the identified destination portable base station.

Replacing one identifier may include inspecting one or more protocol packets passing between the core network and the portable base stations. The method may include storing the first and second identifiers as entries in a table. One or more communication protocol packets may include a data packet, the data packet includes digital content; a voice packet, wherein the voice packet includes audio content; or a control message packet, wherein the control message packet includes commands. One or more communication protocol packet may comply with the Radio Access Network Application Part (RANAP) protocol.

The foregoing method may be implemented as a computer program product comprised of instructions that are stored on one or more machine-readable media, and that are executable on one or more processing devices. The foregoing method may be implemented as an apparatus or system that includes one or more processing devices and memory to store executable instructions to implement the method. A graphical user interface may be generated that is configured to provide a user with access to and at least some control over stored executable instructions to implement the method.

The details of one or more examples are set forth in the accompanying drawings and the description below. Further features, aspects, and advantages are apparent in the description, the drawings, and the claims.

DETAILED DESCRIPTION

Figure 1:
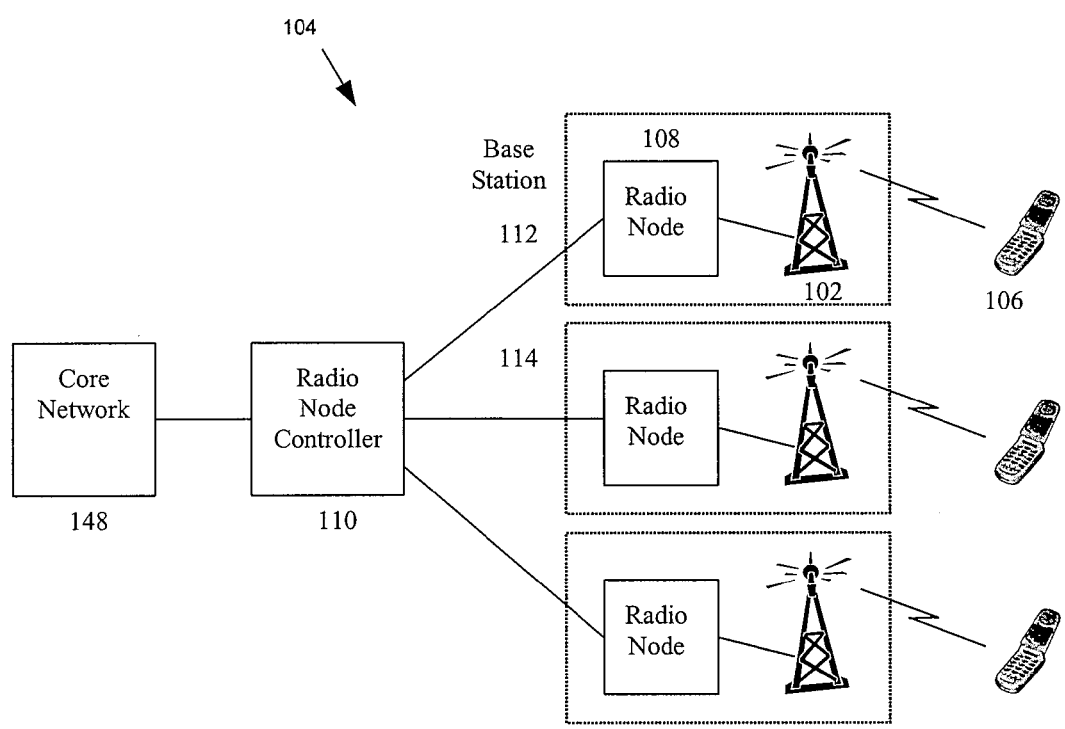
FIG. 1 illustrates an exemplary radio access network.

FIG. 1 illustrates an exemplary cellular communications system. The radio access network (RAN) 104 includes stationary cellular base station 112 that includes a conventional antenna tower 102 that is erected at a fixed location and transmits and receives electromagnetic signals that are provided to and from a radio node (RN) 108. The RN 108 may support one or more of the wireless standards and protocols (e.g., CDMA-2000, UMTS, etc.) to establish communication links (via the antenna tower 102) with one or more mobile handsets (e.g., a mobile handset 106). The RN 108 may include a transceiver for receiving and transmitting electromagnetic signals. The RN 108 may also include various components (e.g., a modulator/demodulator (MODEM)) for modulating a transmission carrier signal to encode digital information for transmission or demodulating a received analog signal to decode transmitted digital information. The RN 108 is connected to a radio node controller (RNC) 110 that provides commands (and transmission signals) to the RN 108 and receives incoming signals from the RN 108. One or more stationary cellular base stations like 112 and 114 are controlled by a radio node controller 110. The radio node controller 110 is in communication with a mobile operator's core network 148 so that communication sessions can be established with other endpoints. For example, data may be sent to other base stations, conventional landline telephone systems (e.g., Plain Old Telephone Service (POTS) systems, etc.) or data networks. The core network 148 also performs other call control functions, mobility functions and high-level security functions. These functions include, for example, mobile handset location updating and authentication.

Figure 2:
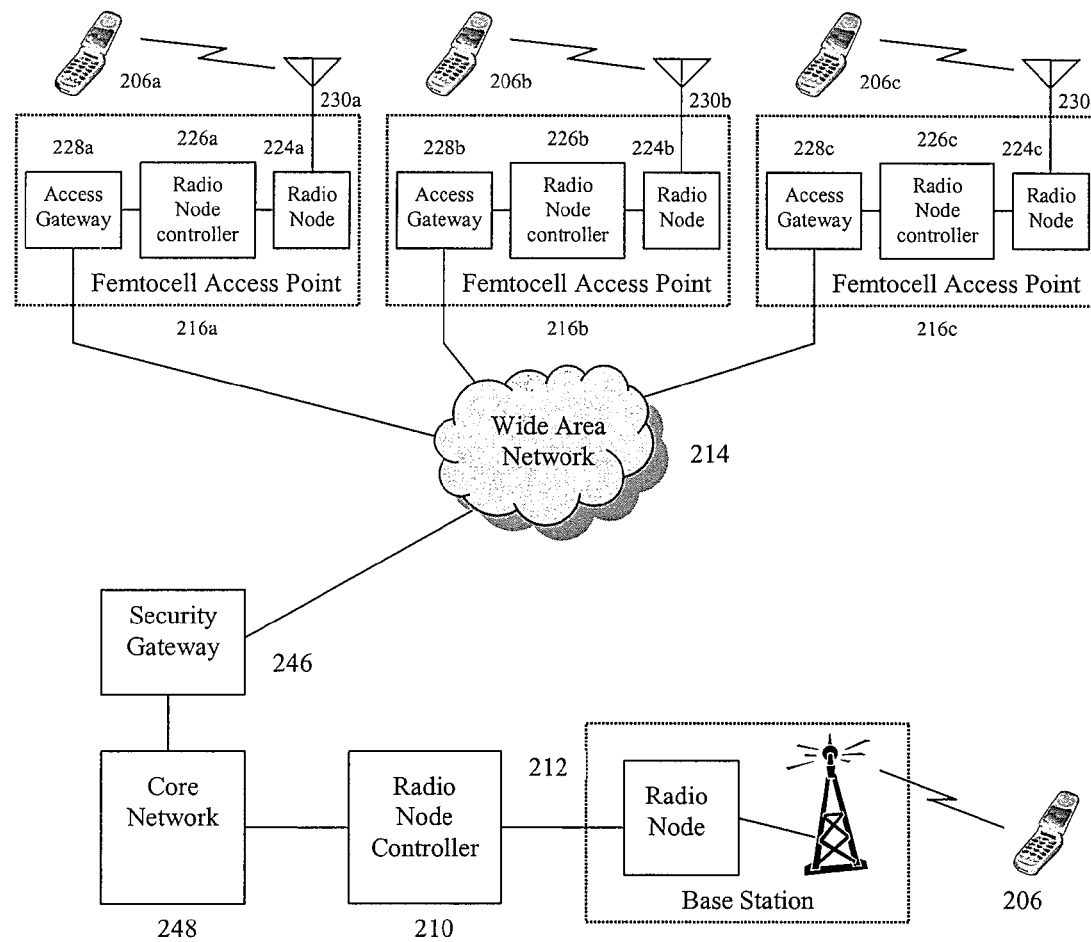
FIG. 2 illustrates an exemplary radio access network that includes femtocell access points.

FIG. 2 illustrates a cellular communications system that includes a stationary base station 212 and RNC 210 as well as a number of portable base stations referred to as femtocell access points (FAP) 216a, 216b, 216c. While the femtocells are typically used in residential applications, another type of portable base station is referred to as a picocell and is typically used in business applications. The FAPs 216a-c include respective antennas 230a-c, RNs 224a-c, RNCs 226a-c, and access gateways 228a-c. The FAPs 216a-c are capable of establishing communication links with one or more mobile handsets 206a-c. Typically, antenna characteristics (e.g., beam pattern, gain, etc.) of the FAP antennas 230a-c are selected for establishing links to mobile handsets located relatively close to the respective FAPs. Furthermore, design characteristics (e.g., component size, power consumption, etc.) of the FAPs 216a-c may be selected for portability. As such, the FAPs 216a-c may provide a smaller wireless coverage area (e.g., coverage to service a single residential home, a portion of a multiple residence building or other structure or location of similar size and area) than the fixed location base station 212. In this illustrated scenario, the FAPs 216a-c are placed in separate locations to establish communication links with respective mobile handsets 206a-c positioned local to the FAPs. By strategically placing the FAPs 216a-c, coverage can provided to mobile handsets in areas with little or no coverage from fixed base stations. For example, homes located along coastlines or in rural areas, campgrounds, mountain lodges, and island resorts may not be covered by commercial cellular services. In some deployments, the FAPs 216a-c may provide increased cellular network capacity in populated areas. For example, FAPs 216a-c may be permanently located in a densely populated office or apartment building, or they may be located temporarily to provide coverage during a sporting event or convention, or to provide coverage while a fixed base station is being repaired (e.g., for normal maintenance or after a natural disaster).

The FAPs 216a-c are in communication with a mobile operator's core network 248 through a wide area network 214. In some implementations, the wide area network 214 may incorporate one or more hardwire and wireless transmission techniques (e.g., wire (copper), optical fiber, radio frequency (microwave), etc.). Along with public communication links (e.g., the Internet), the communication network 114 may use one or more private communication links (e.g., dedicated, T1, T3, E1), or a combination of public and private links. Private communications between the core network 214 and the FAPs 216a-c is facilitated by using a security gateway 246 so that communication through a virtual private network using encrypted tunnels between the FAP access gateways 228a-c and the security gateway 246 may be implemented.

In some network architectures, there is a centrally located RNC, e.g., RNC 210, which communicate the RNs 224a-c in the FAPs. Such an arrangement may suffer from increased communication latencies due to wide area network 214. The increased latency results in long control loops between a centrally located RNC and the RNs 224a-c may result in poor wireless performance. In one embodiment of the FAP the RNC functions 226a-c are joined with the RN functions 224a-c as shown in FIG. 2. The RNCs 226a-c communicate with the core network 248 through the access gateways 228a-c, the wide area network and the security gateway 246. Thus the three FAPs 216a-c appear to the core network 248 as three separate RNCs. As such, a network of many thousands of home FAPs appear to the core network as many thousands of RNCs.

In many implementations, the core network 248 may be capable of being connected with a relatively small number of RNCs. For example, the core network 148 may be designed for interacting with a small number of RNCs (e.g. ten RNCS) which in turn control a small number of fixed location base stations (e.g., one hundred base stations in total). As such, the core network 148 may have difficulties recognizing a considerably larger number of FAPs (e.g., thousands of FAPs). In some implementations it may be possible to introduce new functionality to the core network specifically to support a large network of FAPs. For example, messaging protocols or changes to conventional messaging protocols to address FAP-specific functions or more memory capacity for handling a larger number of FAP IP addresses, cell identifiers, RNC identifiers and location area identifiers.

Figure 3:
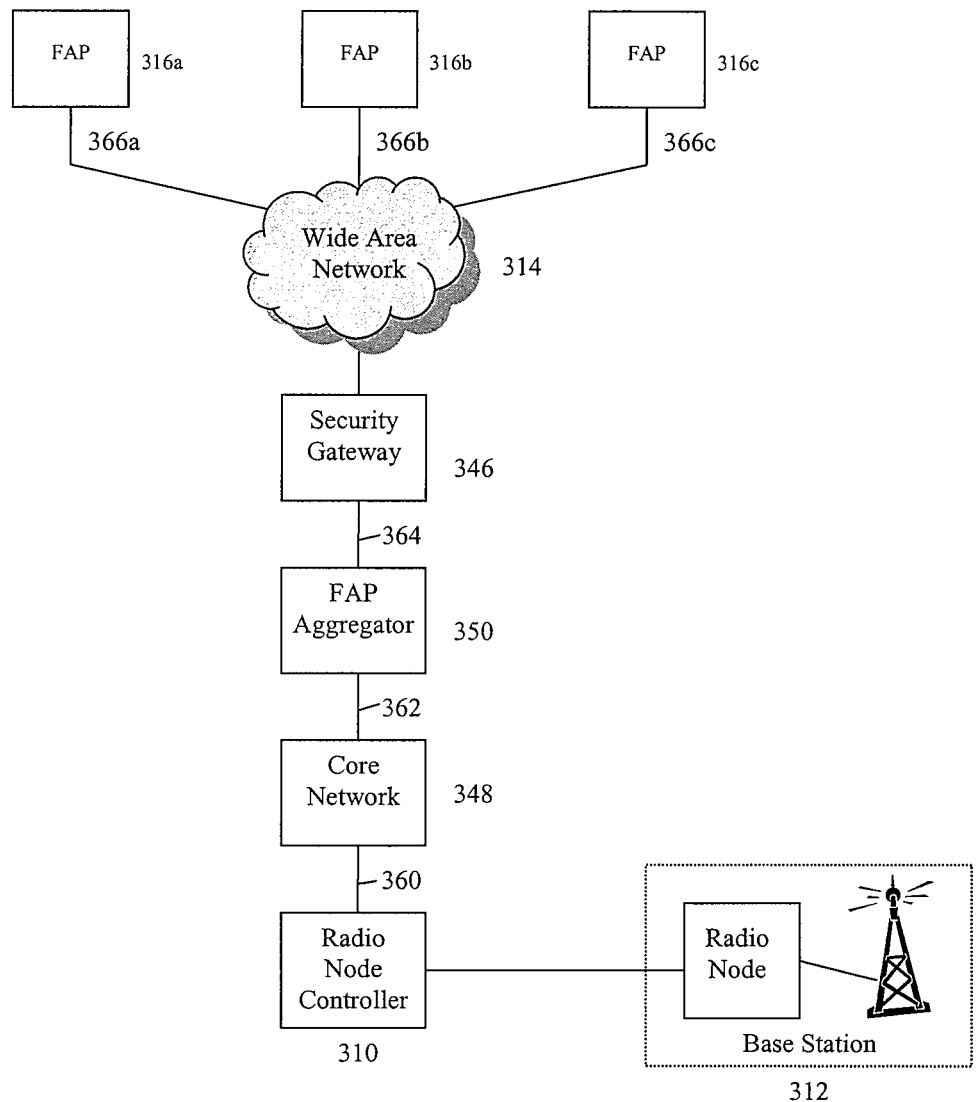
FIG. 3 illustrates an exemplary radio access network that includes femtocell access points and a femtocell access point aggregator.

FIG. 3 shows a modification to a network architecture such as the architecture of FIG. 2. In this architecture a function is provided between the core network 348 and the security gateway 346. This function is referred to as an FAP aggregator 350. The FAP aggregator 350 communicates with the core network 348 over an interface 362, presenting the interface of a single RNC or some small number of RNCs (e.g. ten RNCs) to the core network 348, while enabling the core network to handle connections from mobile handsets passing through many thousands of FAPs. The FAP aggregator 350 communicates with a large network of FAPs (e.g. illustrated with FAPs 316a-c) over interface 364 and via security gateway 346, and wide area network 314. The security gateway 346 provides encryption for the protocols used on interface 364 but may not substantially alter the communications methods and protocols used between FAP aggregator 350 and the FAPs 316a-c. In the architecture of FIG. 3 some of the functions of a conventional RNC 310 are executed by FAP aggregator 350, while other functions of a conventional RNC may be executed by the FAPs 316a-c. This distribution of RNC functions allows the network of FAPs to function properly when communicating with the core network 348 over an unmanaged wide-area network (e.g. the public internet).

The communication methods and protocols used on interface 362 between the core network 348 and the FAP aggregator 350 are typically equivalent to the communication methods and protocols used by interface 360 between the core network 348 and traditional RNC 310 such that few, if any, changes to the existing core network equipment are needed. However, in some implementations of a FAP aggregator the communication methods and protocols used on interface 364 between the FAP aggregator 350 and the FAPs 316a-c may be different from the communication methods and protocols used on interface 362 between the core network 348 and the FAP aggregator 350. In such implementations the communication methods and protocols used on interface 364 may not conform to one or more standard communication methods and protocols used in conventional cellular networks that include large stationary base stations. However, in one or more embodiments, the communication methods and protocols used by interface 364 between the FAP aggregator 350 and the FAPs 316a-c may be substantially equivalent to the communication methods and protocols used on interface 362 between the core network 348 and the FAP aggregator 350. By maintaining equivalent interfaces, the FAPs are able to use communications protocols that are established and have been tested in cellular networks and the FAP aggregator 350 is able to perform its functions by just altering a few fields in the data passing between the core network and the FAPs, rather than substantially or completely translating the data from one protocol to another., thereby allowing for a relatively simple implementation of the FAP aggregator.

Therefore, one main function of the FAP aggregator is to hide the many-end-point topology of the network of FAPs from the core network 348. The FAP aggregator 350 performs this function by mapping various identifiers used in the core network protocol by interface 362, which are appropriate for a small number of RNCs, to a set of identifiers used by interface 364 which are appropriate for a relatively larger number of RNCs.

Figure 4:
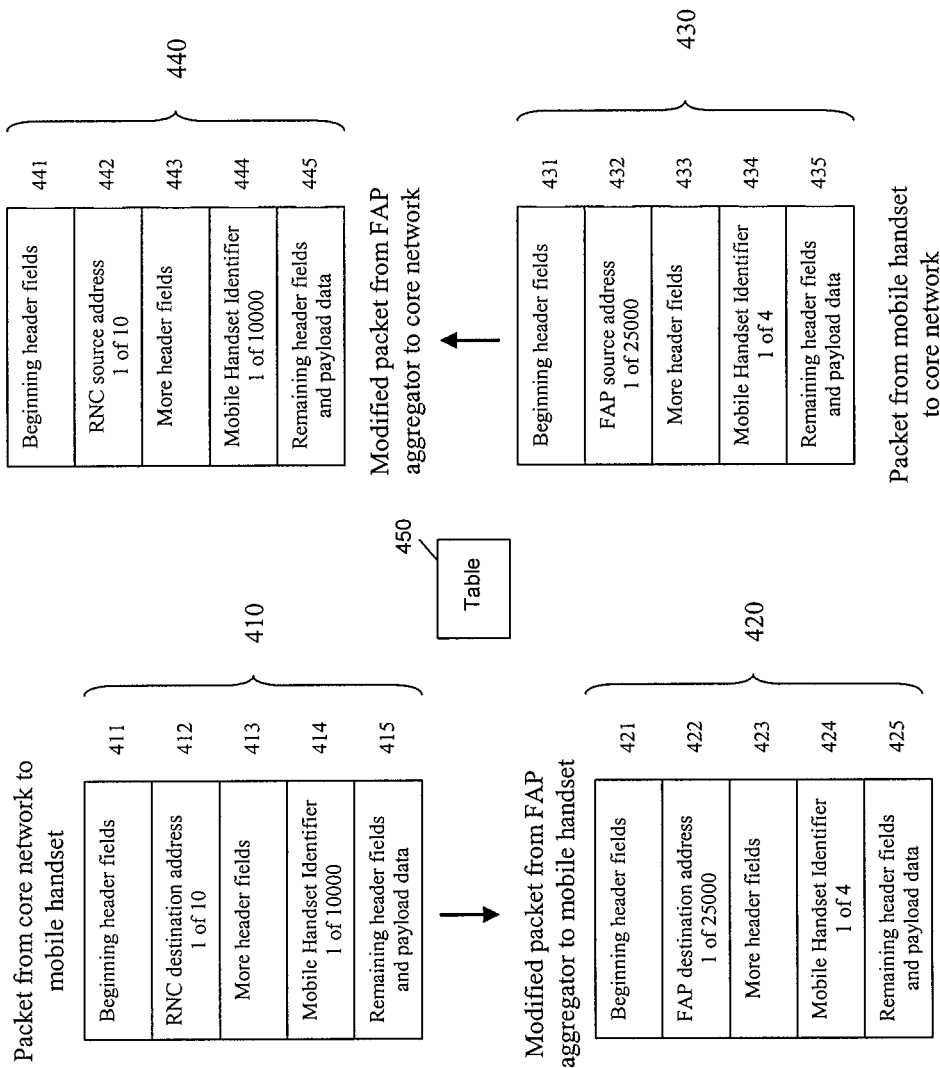
FIG. 4 illustrates modifications of identifiers in a communications protocol packets.

FIG. 4 illustrates this identifier mapping function. Packet 410 is an example of a communication protocol packet sent by the core network to an RNC. This packet begins with some header information 411, following that is RNC address field 412 giving the address of the RNC to which this packet is sent. This address may be, for example an IP address. In general a core network communicates with a few RNCs. Following the RNC address field 412 is zero or more additional fields of information 413. Following that is the mobile handset identifier field 414. In general the core network communicates with thousands of mobile handsets. The remainder of the packet includes additional header fields and payload data 415. If this packet is being sent to a mobile handset attached to a FAP, then the RNC address is the address of a distributed RNC represented by a FAP aggregator and a destination FAP. The FAP aggregator maintains a table 450 indexed by the mobile handset identifier which gives the FAP destination address that may be used to reach that mobile handset. There may be many thousands of entries in such a table. The FAP aggregator may alter the packet by replacing the distributed RNC address field 412 with the FAP destination address field 422. Packet 420 is then sent to the FAP via the wide area network. In the reverse direction, packet 430 is an example of a communication protocol packet sent by the FAP to the core network. This packet begins with some header information 431, following that is a FAP address field 432 giving the source address of the FAP from which this packet is sent. This address could be, for example an IP address. Following the FAP address field 432 is zero or more additional fields of information 433. Following that is the mobile handset identifier field 434. In general the FAP may be in communication with only a few mobile handsets. The remainder of the packet is more header fields and the payload data 435. The FAP aggregator maintains a table indexed by the FAP source address which gives the address of the associated distributed RNC. Many thousands of entries may be included in such a table. The FAP aggregator may alter the packet by replacing the FAP source address field 432 with the distributed RNC address field 442. Packet 440 may then sent to the core network.

In cellular network implementations there typically are different types of communications traffic between the core network and the mobile handset, and each may have a different packet format. For example, there can be control message packets, voice payload packets and data packets. Each packet format may have a different method for encoding RNC addresses and mobile handset identifiers. The FAP aggregator may have different mapping tables for each different type of communications traffic. These mapping tables may be created dynamically from information contained in the control message packets. For example, in FIG. 3 if a voice call is initiated by a mobile handset through FAP 316a, then all voice payload packets being sent from core network 348 to that mobile handset must be addressed to FAP 316a. If, at a later time, the same mobile handset initiates a voice call through FAP 316b, then all voice payload packets being sent from core network 348 to that mobile handset must be addressed to FAP 316b.

Figure 5:
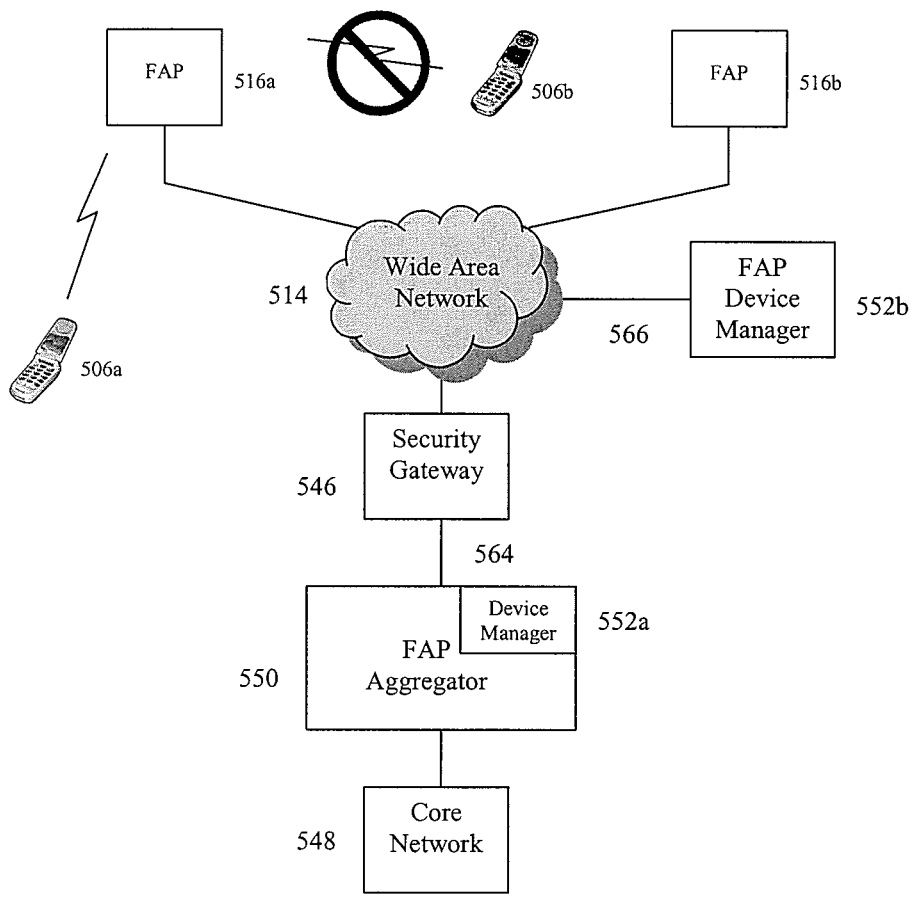
FIG. 5 illustrates a femtocell access point aggregator that provides access control and device management functions.

FAP-specific functionality absent from conventional cellular networks can be added to the FAP aggregator by introducing additional messaging protocols between the FAP aggregator and the FAPs. FIG. 5 shows a FAP aggregator 550 augmented by a FAP device management function 552a. This device management function shares communication link 564 with the normal cellular network functions (e.g. call control or mobility management). Since this added functionality is not related to functions provided by the core network, the FAP device management function can also be instantiated as a separate device such as FAP device management entity 552b using a separate communication link 566. In this latter instantiation, the FAP device manager might also provide for encrypted communication over link 566. Examples of useful functions that can be provided by the FAP device manager are individual FAP configuration and FAP access control.

The FAP device manager 552a-b can provide one central point for the configuration of the whole network of FAPs. Radio parameters such as carrier frequency and scrambling code and mobility parameters such as location area can be coordinated geographically to minimize interference between FAPs. The FAP device manager 552a-b can be used to store a list of authorized mobile handset identifiers for each FAP in a centralized data base. Having a centralized data base of authorized mobile handset identifiers per FAP enables the implementation of centrally controlled mobile handset access policies. For example, in FIG. 5 mobile handset 506a is authorized to use FAP 516a. When mobile handset 506a communicates with FAP 516a in order to register with the core network, that registration is passed to the core network by the FAP aggregator. However, mobile handset 506b is may not be authorized to use FAP 516a. When handset 506b attempts to communicate with FAP 516a to register with the core network, FAP-based access control would reject that communication attempt and no registration request would reach the FAP aggregator 550 or the core network 548. If central access control is implemented in the FAP aggregator, then the registration request from mobile handset 506b can be passed to the FAP aggregator, where rejection could be qualified by other information such as the a class of service for mobile handset 506b or network-wide load balancing considerations.

Figure 6:
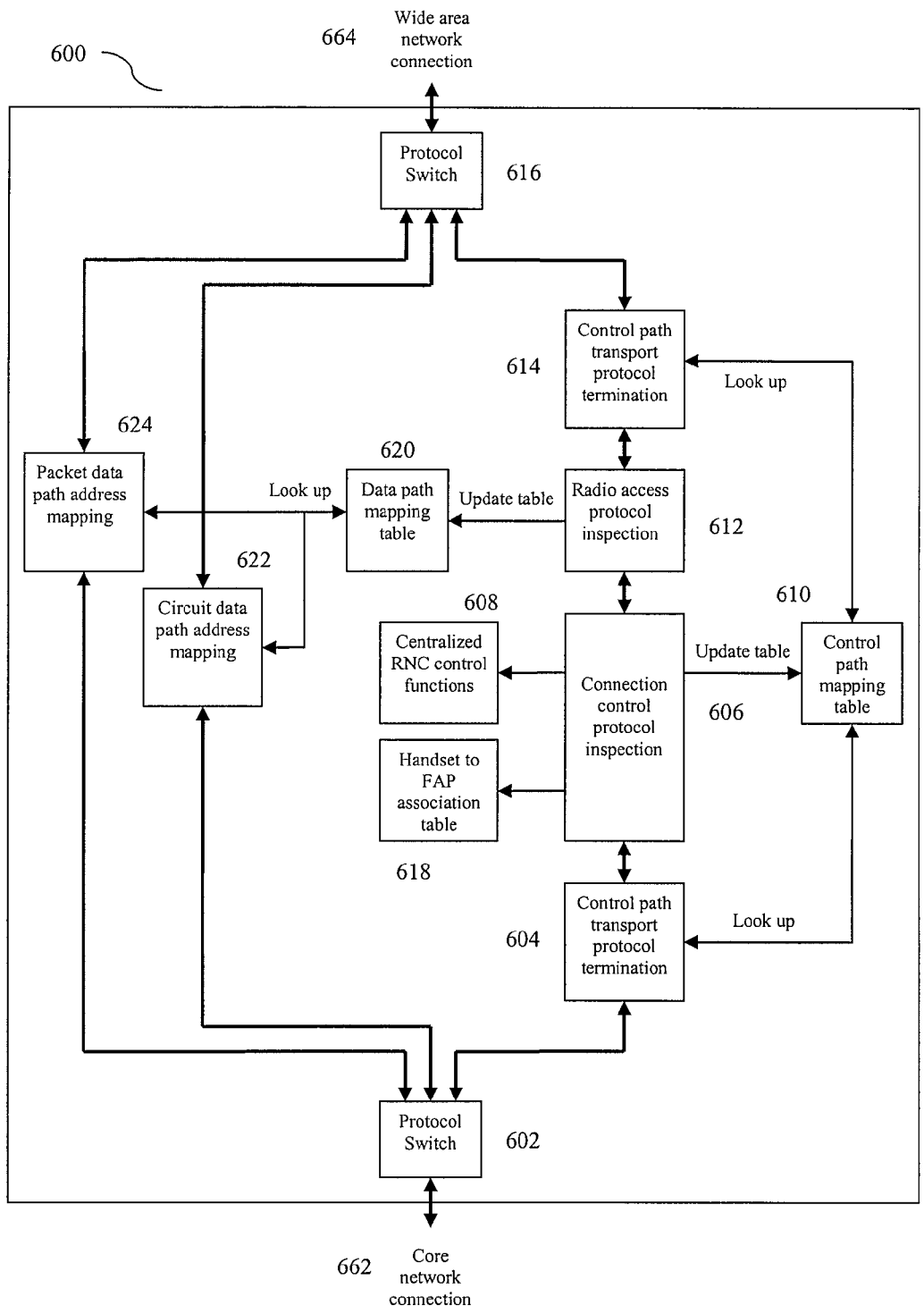
FIG. 6 illustrates functional portions of a femtocell access point aggregator.

FIG. 6 illustrates an exemplary implementation of a FAP aggregator 600 for the specific case of a Universal Mobile Telecommunications System (UMTS) cellular network. (See 3GPP Technical Specifications 23.101 "General UMTS Architecture" and 25.401 "UTRAN Overall Description", both of which are herein incorporated by reference). The core network connection 662 can be an IP network or an ATM network. In the terminology of the UMTS standards, core network connection 662 is known as the Iu interface. If the core network connection 662 is an ATM network additional protocol conversion stages, which are not shown in the diagram, are required. If the core network connection 662 is to an IP network then the communication methods and protocols at the core network connection 662 are the same as the communication methods and protocols at the wide area network connection 664. In a UMTS network there are three different types of communications traffic between the core network and the mobile handset, each with a different protocol. These different traffic types are control message traffic, circuit switched data traffic (e.g. voice) and packet switched data traffic. Each type of traffic is carried with a different protocol. Bi-directional protocol switches 602 and 616 transport the different types of traffic through three different paths in the FAP aggregator 600. For the control message path the transport protocol is terminated at the core network connection by transport protocol termination function 604 and at the wide area connection transport protocol termination function 614. Only the message contents pass through the remainder of the path. This transport protocol termination allows for reliable control message transport (e.g. via error detection and retransmission) between the FAP aggregator and the core network on one end, and between the FAP aggregator and the FAPs on the other end. The control message protocol consists of two parts. A connection control protocol handles connections between the mobile handset and the core network as well as messages between the core network and the RNC itself for general maintenance functions and for mobile handset paging. This protocol is known as "Signaling Connection Control Part" or SCCP (see ITU-T Recommendation Q.711). A radio access control protocol handles radio access procedures between the mobile handset and the core network. This protocol is known as "Radio Access Network Application Part" or RANAP (see 3GPP Technical Specification 25.413 "UTRAN Iu interface RANAP signaling").

The connection control protocol assigns an identifier to each communication direction at the beginning of a mobile handset registration or at the beginning of a call from or to a mobile handset. These identifiers are called signaling connection identifiers. The connection control protocol inspection function 606 makes an entry in control path mapping table 610 when the signaling connection identifiers are assigned. The table entry contains the signaling connection identifier for each communication direction, the mobile handset identifier, a transport address for the FAP in communication with the mobile handset and a transport address for the core network. When a mobile handset registration occurs, the connection control protocol inspection function 606 also makes an entry in the handset to FAP association table 618. Transport protocol termination function 604 and transport protocol termination function 614 use control path mapping table 610 to alter the transport addresses in the control message packets. For example, since the core network is effectively in communication with the FAP aggregator as one large RNC, a control message packet from the core network to the FAP will contain the transport address of the FAP aggregator. Transport protocol termination function 614 replaces the transport address of the FAP aggregator with the transport address of the FAP for every control message going to a mobile handset connected to that FAP. In addition to control messages used to initiate and terminate mobile handset calls, there are control messages used for RNC maintenance functions and for handset paging. These messages are addressed to the RNC itself. The connection control protocol inspection function 606 directs these messages to a centralized RNC control function. If the message is a mobile handset page, then the handset to FAP association table 618 is consulted to direct the paging message to the appropriate FAP via control path protocol termination function 614.

The radio access protocol assigns transport addresses to the data path at the beginning of a call from or to a mobile handset. If the call is a circuit switched call (e.g. a voice call) then a circuit data path transport address is assigned to each direction of the call. If the call is a packet switched call (e.g. for web browsing) then a packet data path transport address is assigned to each direction of the call. The radio access protocol inspection function 612 makes an entry in data path mapping table 620 when the data path transport addresses are assigned. In addition, the data path transport address assignment messages themselves are altered so that the core network and the FAP get the correct transport addresses in the radio access protocol messages that they receive. During a circuit switched call the circuit data path address mapping function 622 replaces transport addresses in the packets in each direction with the appropriate transport addresses from data path mapping table 620. During a packet switched call the packet data path address mapping function 624 replaces transport addresses in the packets in each direction with the appropriate transport addresses from data path mapping table 620. In this way, the FAP aggregator and the FAPs function together as a distributed RNC so that core network functions do not need to be altered to accommodate a large network of FAPs.

The exemplary implementation of a FAP aggregator 600 applies to a UMTS cellular network. Other types of cellular networks, such as GSM and CDMA-2000, would use similar techniques to implement the FAP aggregator functions to hide the many-end-point topology of the network of FAPs from the core network, while still retaining the basic core network protocols on the communication links from the FAPs to the wide area network. The functions of control message protocol inspection and control path and data path transport address mapping are applicable to any cellular network.

The FAP aggregator 600 may be implemented as a server or a portion of a server that executes the FAP aggregator stored program. However, one or more other types of computing devices may be implemented individually or in combination with such a server to execute the FAP aggregator functions. To store the program and the mapping table information, the FAP aggregator 600 may include mass media storage devices (e.g., hard drive, CD-ROM, etc.) However, in some implementations, storage may be provided by memory (e.g., random access memory (RAM), dynamic RAM (DRAM), static RAM (SRAM), etc.) individually or in combination with mass media storage devices.

In FIG. 5 the security gateway 546 provides authentication for FAPs that are connecting to the core network and encryption for the control path and data path traffic between the FAPs and the FAP aggregator. This function is necessary to protect the core network from unauthorized use or attacks from the wide area network and its use is well known in the art. The encrypted control packets and data packets include additional headers and addressing information called an encapsulation header to form what is known as a secure tunnel. The security gateway processes those additional headers and addressing information, adding them to packets sent toward the wide area network and removing them for packets coming from the wide area network.

Figure 7:
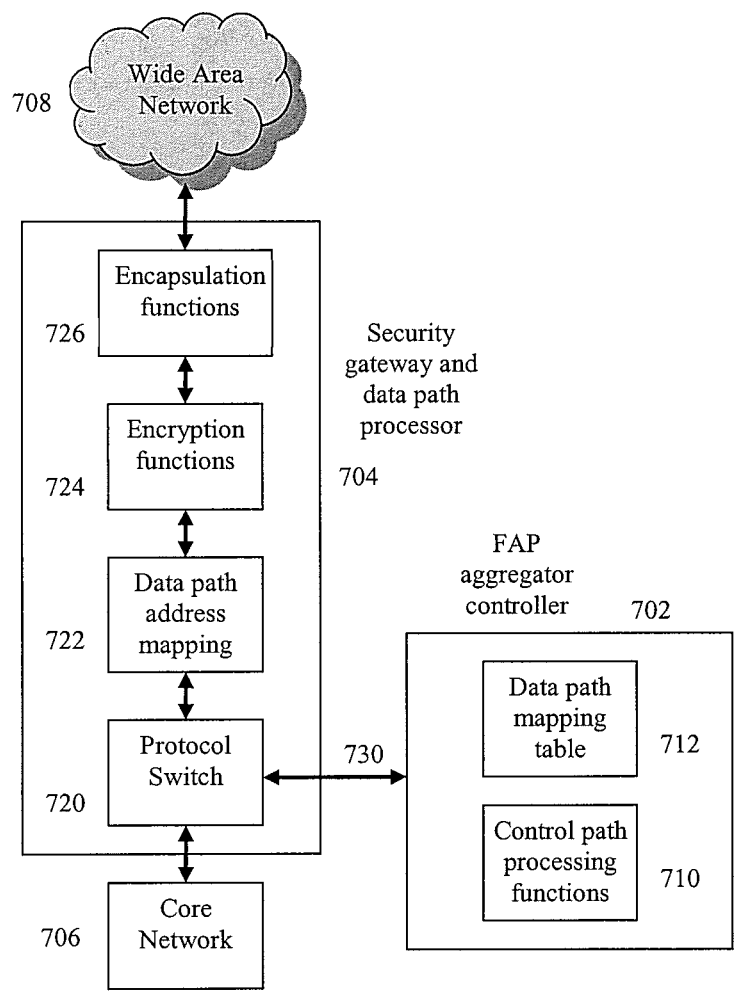
FIG. 7 illustrates femtocell access point aggregator functions integrated into a security gateway.

FIG. 7 shows a FAP aggregator and security gateway combination implemented as a FAP aggregator controller 702 and a security gateway and data path processor 704. The security gateway and data path processor 704 is in communication with the core network 706, the wide area network 708 and the FAP aggregator controller 702. This is just a different partitioning of the FAP aggregator and security gateway functions. Since security gateway 704 is adding and removing the encapsulation headers for all traffic passing through it, it may be efficient to combine this function with the circuit data path address mapping and packet data path address mapping functions. The data path processing would consume the most processing resources in an implementation of the FAP aggregator so efficiency may be gained by having one device perform all of the data path functions. The remaining FAP aggregator functions would be control path processing only implemented in FAP aggregation controller 702. The FAP aggregator controller 702 contains control path processing functions 710 and data path mapping table 712. Security gateway and data path processor 704 contains protocol switch 720, data path address mapping functions 722, encryption functions 724 and encapsulation functions 726. Communication link 730 interfaces the control message traffic to the FAP aggregator controller 702 for processing and provides a means for the security gateway 704 to access the data path mapping table 712 in the FAP aggregator controller 702. Since the core network interface data path protocols may be unmodified by the FAP aggregator function, there is no need for any protocol translation in the data path functions in security gateway 704. Other partitioning of this system are also possible including security gateway and FAP aggregator functions combined into one device.

In some implementations the basic transport mechanism from the core network to conventional RNCs may not match the basic transport mechanism used by the wide area network. An example of this situation is when the core network is using ATM transport and the wide area network is using IP transport. In such cases the FAP aggregator may be connected to the core network via an ATM to IP gateway. Such gateways are well known in the art. The ATM to IP gateway could, for example, be integrated with the FAP aggregator or it could be a separate device inserted between the core network and the FAP aggregator.

Figure 8:
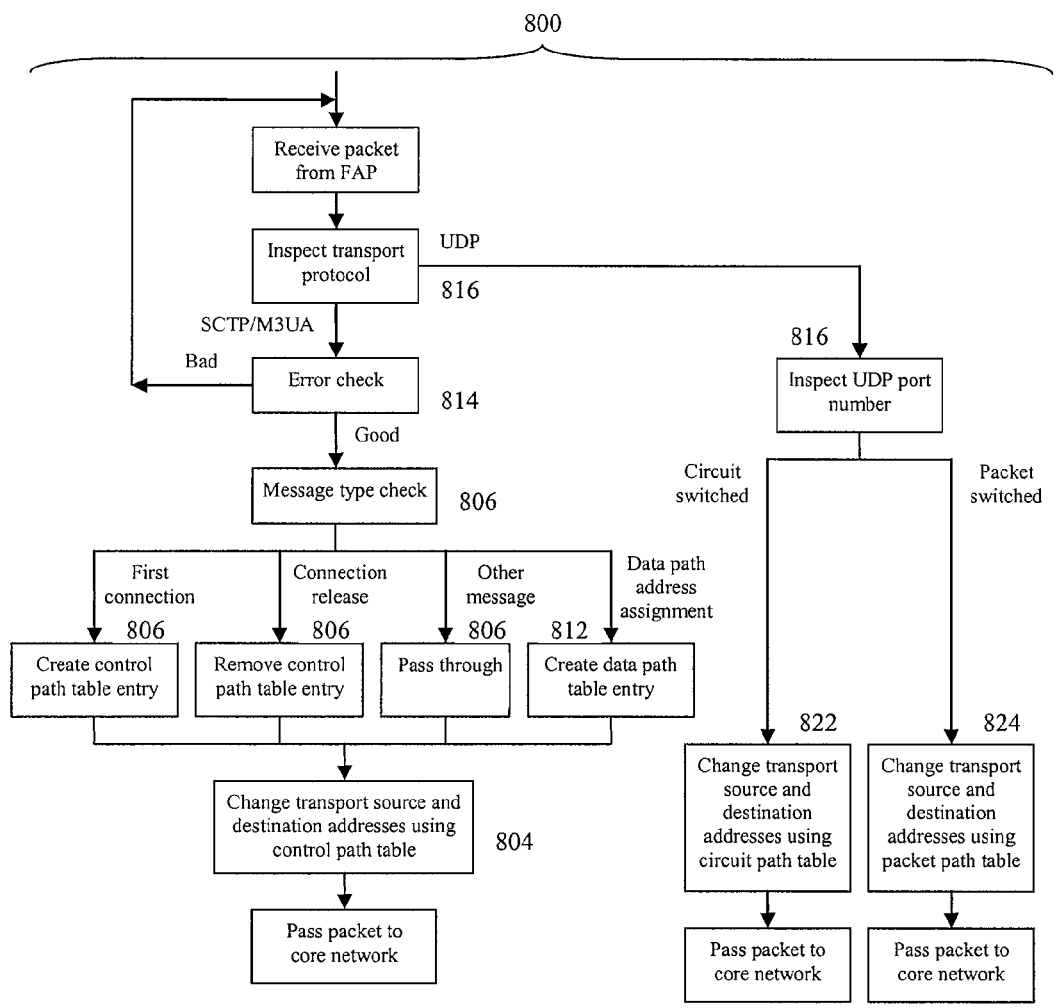
FIGS. 8 and 9 are flow charts of operations of a femtocell access point aggregator for processing packets.

FIG. 8 is a flow chart 800 illustrating FAP aggregator operations performed for a packet sent from an FAP to a core network. The FAP aggregator receives a packet from a FAP via the communication link to the security gateway. In some implementations (e.g., IP network) the packet may include a header field that identifies the next layer protocol. In some implementations the next layer protocol is SCTP followed by M3UA for a control message packet and UDP for a data path packet. The UDP port number further identifies the packet as circuit switched or packet switched data. This protocol routing function is performed by the protocol switch operations 816. In the case of SCTP and M3UA the packet is passed to the control path transport protocol termination function 814. The packet is checked for errors and for the correct end-point addressing. If these checks fail the packet is discarded. Otherwise the packet is passed to the connection control protocol inspection function 806. In some implementations the connection control protocol will indicate whether or not this is the first packet in a connection from a mobile handset. In case it is the first packet, the mobile handset identifier is given and a connection identifier is assigned. The connection control protocol inspection function 806 will create a table entry associating the mobile handset identifier, the FAP transport protocol address and the connection identifier. If the message is a connection release message, this information is removed from the table. If the message is a data path address assignment message the radio access protocol inspection function 812 may create a table entry associating the IP address of the FAP and other data path addressing information (e.g. UDP port number) assigned by the FAP to the FAP aggregator IP address and other data path addressing information that is unique within the FAP aggregator (e.g. a different UDP port number). Other control messages may not be processed but simply passed through. Control messages are passed to the control path transport protocol termination 804 where the FAP source and destination transport addresses are changed to FAP aggregator source and destination transport addresses. Circuit switched data is passed to the circuit data path address mapping function 822 which changes FAP addressing information to FAP aggregator addressing information. Packet switched data is passed to the packet data path address mapping function 824 which changes FAP addressing information to FAP aggregator addressing information.

Figure 9:
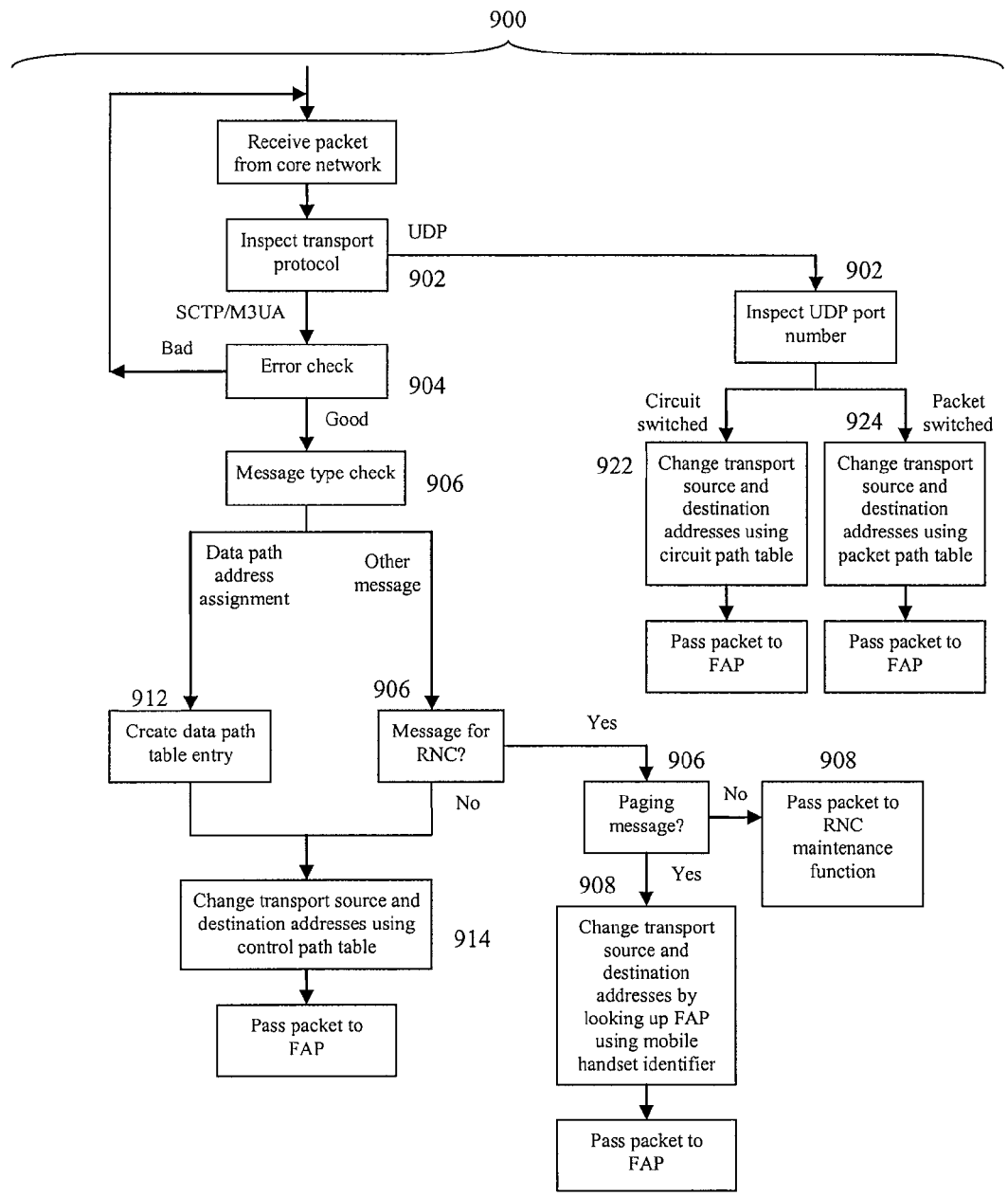

FIG. 9 is a flow chart 900 illustrating FAP aggregator operations performed for sending a packet from a core network to an FAP. The FAP aggregator receives a packet from the core network. In some implementations (e.g. IP network) the packet may include a header field that identifies the next layer protocol. In some implementations the next layer protocol is SCTP followed by M3UA for a control message packet and UDP for a data path packet. The UDP port number further identifies the packet as circuit switched or packet switched data. This protocol routing function is performed by the protocol switch operations 902. In the case of SCTP and M3UA the packet is passed to the control path transport protocol termination function 904. The packet is checked for errors and for the correct end-point addressing. If these checks fail the packet is discarded. Otherwise the packet is passed to the connection control protocol inspection function 906. If the message is a data path address assignment message the radio access protocol inspection function 912 creates a table entry associating the IP address of the FAP aggregator and other data path addressing information (e.g. UDP port number) assigned by the FAP core network to a FAP IP address and other data path addressing information that is unique within the FAP (e.g. a different UDP port number). In some implementations other control messages are inspected for messages to be processed by the centralized RNC functions 908. Maintenance messages are processed by the centralized RNC functions 908. Paging messages are directed to the correct FAP by looking up the mobile handset identifier in the handset to FAP association table. Control messages to be sent to a FAP are passed to the control path transport protocol termination 914 where the FAP source and destination transport addresses are changed to FAP aggregator source and destination transport addresses. Circuit switched data is passed to the circuit data path address mapping function 922 which changes FAP addressing information to FAP aggregator addressing information. Packet switched data is passed to the packet data path address mapping function 924 which changes FAP addressing information to FAP aggregator addressing information.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other implementations are within the scope of the following claims. The techniques described herein can be performed in a different order and still achieve desirable results.

What is claimed is:

1. A method, comprising:
modifying at least one communication protocol packet being passed between at least one of a plurality of uniquely identified portable base stations and a core network such that the core network considers the plurality of uniquely identified portable base stations as a single base station and considers the plurality of uniquely identified portable base stations as being hidden from the core network, wherein the at least one communication protocol packet is modified external to the plurality of uniquely identified portable base stations, wherein modifying the at least one communication protocol packet includes replacing a first identifier included in the at least one communication protocol packet with a second identifier to form a second packet that identifies the source of the at least one communication protocol packet as an aggregate of portable base stations, wherein the first identifier identifies one portable base station from which the at least one communication protocol packet is received, a handset in communication with the portable base station and a communication session established between the handset and the core network; and
providing the second packet to the core network.

2. The method of claim 1, further comprising:
receiving a first packet from the core network for delivery to a handset in communication with a portable base station that is included in the plurality of uniquely identified portable base stations, wherein the first packet includes a first identifier that identifies an aggregate of portable base stations, the handset and a communication session between the handset and the core network;
replacing the first identifier with a second identifier, which identifies a destination portable base station, to form a second packet; and
providing the second packet to the identified destination portable base station.

3. The method of claim 1, wherein replacing the first identifier includes inspecting at least one protocol packet passing between the core network and the plurality of uniquely identified portable base stations.

4. The method of claim 1, further comprising
storing the first and second identifiers as entries in a table.

5. The method of claim 1, wherein the at least one communication protocol packet includes at least one of:
a data packet including digital content;
a voice packet including audio content; and
a control message packet including commands.

6. The method of claim 1, wherein the communication protocol packet compiles with the Radio Access Network Application Part (RANAP) protocol.

7. A system, comprising:
a gateway for passing at least one communication protocol packet between at least one of a plurality of uniquely identified portable base stations and a core network; and
an aggregator for modifying the at least one communication protocol packet such that the core network considers the plurality of uniquely identified portable base stations as a single base station and considers the plurality of uniquely identified portable base stations as being hidden from the core network, wherein the aggregator is external to the plurality of uniquely identified portable base stations, the aggregator is configured to replace a first identifier included in the at least one communication protocol packet with a second identifier to form a second packet that identifies the source of the at least one communication protocol packet as an aggregate of portable base stations, wherein the first identifier identifies one portable base station from which the at least one communication protocol packet is received, a handset in communication with the portable base station and a communication session established between the handset and the core network, wherein the aggregator is further configured to provide the second packet to the core network.

8. The system of claim 7, wherein the aggregator is configured to:
receive a first packet from the core network for delivery to a handset in communication with a portable base station that is included in the plurality of uniquely identified portable base stations, wherein the first packet includes a first identifier that identifies an aggregate of portable base stations, the handset and a communication session between the handset and the core network;
replace the first identifier with a second identifier, which identifies a destination portable base station, to form a second packet; and
provide the second packet to the identified destination portable base station.

9. The system of claim 7, wherein replacing the first identifier includes inspecting at least one protocol packet passing between the core network and the plurality of uniquely identified portable base stations.

10. The system of claim 7, further comprising:
at least one device manager for storing the first and second identifiers as entries in a table.

11. The system of claim 7, wherein the at least one communication protocol packet includes at least one of:
a data packet including digital content;
a voice packet including audio content; and
a control message packet including commands.

12. The system of claim 7, wherein the communication protocol packet compiles with the Radio Access Network Application Part (RANAP) protocol.

13. A computer program product, encoded on a computer-readable medium, operable to cause data processing apparatus to perform operations comprising:
modifying at least one communication protocol packet being passed between at least one of a plurality of uniquely identified portable base stations and a core network such that the core network considers the plurality of uniquely identified portable base stations as a single base station and considers the plurality of uniquely identified portable base stations as being hidden from the core network, wherein the at least one communication protocol packet is modified external to the plurality of uniquely identified portable base stations, wherein modifying the at least one communication protocol packet includes replacing a first identifier included in the at least one communication protocol packet with a second identifier to form a second packet that identifies the source of the at least one communication protocol packet as an aggregate of portable base stations, wherein the first identifier identifies one portable base station from which the at least one communication protocol packet is received, a handset in communication with the portable base station and a communication session established between the handset and the core network; and
providing the second packet to the core network.

14. The computer program product of claim 13, further comprising:
receiving a first packet from the core network for delivery to a handset in communication with a portable base station that is included in the plurality of uniquely identified portable base stations, wherein the first packet includes a first identifier that identifies an aggregate of portable base stations, the handset and a communication session between the handset and the core network;
replacing the first identifier with a second identifier, which identifies a destination portable base station, to form a second packet; and
providing the second packet to the identified destination portable base station.

15. The computer program product of claim 13, wherein replacing the first identifier includes inspecting at least one protocol packet passing between the core network and the plurality of uniquely identified portable base stations.

16. The computer program product of claim 13, further comprising
storing the first and second identifiers as entries in a table.

17. The computer program product of claim 13, wherein the at least one communication protocol packet includes at least one of:
a data packet including digital content;
a voice packet including audio content; and
a control message packet including commands.

18. The computer program product of claim 13, wherein the communication protocol packet compiles with the Radio Access Network Application Part (RANAP) protocol.

* * * * *